(12) United States Patent
Hansmann et al.

(10) Patent No.: US 7,490,062 B2
(45) Date of Patent: Feb. 10, 2009

(54) METHOD OF PAYMENT BY MEANS OF AN ELECTRONIC COMMUNICATION DEVICE

(75) Inventors: Uwe Hansmann, Altdorf (DE); Horst Henn, Boeblingen (DE); Lothar Merk, Weil i.Sch. (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 09/752,959

(22) Filed: Jan. 2, 2001

(65) Prior Publication Data

US 2001/0016835 A1 Aug. 23, 2001

(30) Foreign Application Priority Data

Dec. 30, 1999 (EP) ................... 99126170

(51) Int. Cl.
*G06Q 40/00* (2006.01)
*H04M 11/00* (2006.01)

(52) U.S. Cl. ......................... 705/39; 455/406
(58) Field of Classification Search .............. 705/35–40
See application file for complete search history.

(56) References Cited

U.S. PATENT DOCUMENTS

| | | | | |
|---|---|---|---|---|
| 5,739,512 A * | 4/1998 | Tognazzini | ............... | 235/380 |
| 5,991,749 A * | 11/1999 | Morrill, Jr. | ............... | 705/44 |
| 6,023,509 A * | 2/2000 | Herbert et al. | ............... | 705/76 |
| 6,023,689 A * | 2/2000 | Herlin et al. | ............... | 705/67 |
| 6,029,150 A * | 2/2000 | Kravitz | ............... | 705/39 |
| 6,055,566 A * | 4/2000 | Kikinis | ............... | 709/219 |
| 6,112,084 A * | 8/2000 | Sicher et al. | ............... | 370/337 |
| 6,169,890 B1 * | 1/2001 | Vatanen | ............... | 455/406 |
| 6,175,557 B1 * | 1/2001 | Diachina et al. | ............... | 370/313 |
| 6,445,701 B1 * | 9/2002 | Bahl | ............... | 370/368 |
| 6,556,680 B1 * | 4/2003 | Leonardi | ............... | 380/247 |
| 6,574,314 B1 * | 6/2003 | Martino | ............... | 379/93.17 |
| 6,658,248 B1 * | 12/2003 | Lee | ............... | 340/5.9 |
| 6,980,970 B2 * | 12/2005 | Krueger et al. | ............... | 705/39 |
| 7,031,939 B1 * | 4/2006 | Gallagher et al. | ............... | 705/39 |
| 2001/0005840 A1 * | 6/2001 | Verkama | ............... | 705/67 |
| 2001/0037249 A1 * | 11/2001 | Fitzgerald et al. | ............... | 705/23 |
| 2002/0100798 A1 * | 8/2002 | Farrugia et al. | ............... | 235/380 |
| 2002/0111164 A1 * | 8/2002 | Ritter | ............... | 455/426 |

FOREIGN PATENT DOCUMENTS

EP 0 940 783 A2 * 8/1999

* cited by examiner

*Primary Examiner*—Hani Kazimi
*Assistant Examiner*—Olabode Akintola
(74) *Attorney, Agent, or Firm*—Ference & Associates LLC

(57) ABSTRACT

A method, system and program for payment in a purchasing action performed by means of a cellular standard communication between a customer using said cellular standard communication device and a provider offering goods and/or services, wherein the communication between said customer and said provider is performed via a voice channel of said communication device and transmissions of an electronic bill from said provider to said customer, of a money transfer order from said customer to a payment provider and of a receipt of payment from said payment provider to said customer are performed via a service channel of the cellular standard network.

14 Claims, 1 Drawing Sheet

ND OF PAYMENT BY MEANS OF AN
ELECTRONIC COMMUNICATION DEVICE

METHOD OF PAYMENT BY MEANS OF AN ELECTRONIC COMMUNICATION DEVICE

FIELD OF THE INVENTION

This invention generally relates to improvements in payment procedures in electronic business and more particularly to a method of payment in a purchasing action performed by means of an electronic communication device.

BACKGROUND OF THE INVENTION

More and more goods and services are purchased electronically today by the aid of electronic communication devices. Such communication devices are computers with an on-line connection or stationary or mobile (cellular) phones. When using a modern cellular phone, the user/customer has the choice of dialling the telephone number of a provider offering goods and/or services in order to talk to the provider in person via a voice channel, or to build up an internet connection in order to place his purchase order on the website of the provider.

A very important cellular standard network is the so-called GSM (Groupe Spécial Mobile/Global system for mobile communications). Mobile stations under the GSM comprise the mobile equipment (cellular phone) itself and a so-called subscriber identity module (SIM), the latter essentially consisting in a GSM specific chip card. The function of the SIM consists in ensuring that only authorized persons obtain access to the net, thus securing an operating call metering. To achieve this goal, the SIM securely stores user specific data (international mobile subscriber identity—IMSI) and executes a cryptographic algorithm under secure conditions.

A very common method of payment in electronic business transactions consists in that the customer gives his credit card particulars to the provider. The provider then verifies the credit card data and, upon positive authentication of the data, delivers the purchased goods or services. However, because of the high risk of fraud when passing on credit card particulars via a relatively open network to unknown persons, a lot of users deter from this method of payment.

Another known method of payment involves the use of smart cards which overcome the drawback of the danger of fraud, but which often fails due to the missing public key infrastructure and a lack of customer acceptance.

With the increasing importance of electronic commerce and electronically transacted purchasing actions, there is in fact a high need of a secure and commonly acceptable payment method.

SUMMARY OF THE INVENTION

Accordingly, it is a primary object of the present invention to overcome the drawbacks mentioned above and to provide a unique method and system for the payment in electronically transacted purchasing actions which can be universally employed and which is not limited to the use of a personal computer.

These and other objects of the present invention are accomplished by exchanging electronic bills, money transaction orders and signed payment receipts between a customer, a service provider, a payment provider and a telecommunication provider based on existing sophisticated security mechanisms as provided by SIM cards and the existing billing system of the telecommunication companies. The concept according to the present invention is very suitable for but not limited to mobile (cellular) phones. According to the invention, it is possible to use the existing GSM/SIM chip card in any other PAD, PvC device or personal computer as these devices are already functioning as electronic communication devices via internet connection.

Particularly, according to the present invention, the method of payment consists in building up a connection between a customer and a provider offering goods and/or services via a communication channel of the communication device. When the customer decides to purchase a good or service, he sends a purchase order to the provider, either a spoken purchase order via a voice channel or an electronic purchase order (created by typing or clicking an appropriate button) via internet connection or a service channel of the communication device. Upon receipt of the purchase order, the provider issues an electronic bill and transmits said electronic bill to the customer. The customer verifies and acknowledges the electronic bill as received from the provider. Upon acknowledgement by the customer, a money transfer order is created and transmitted to a payment provider who executes the money transfer order by debiting an account of the customer. This account may be the telecommunications account of the customer at his telecommunication company. Then, a receipt of payment is created by the payment provider and sent to the communication device of the customer which forwards said receipt of payment to the provider as proof of payment, and the purchased good or service is delivered by the provider.

The benefits of the invention consist in providing a secure payment method which can be readily employed by cellular phone users without the need of additional hardware infrastructure, based on the existing sophisticated security concepts of cellular standard networks. The authorization of the customer is achieved by the identification and call metering mechanisms of the cellular standard networks, e.g. the use of the SIM and existing service channels. This results in a very fast execution of the payment method according to the present invention as the (voice channel) connection between the customer and the provider does not have to be interrupted and the electronic bills, money transaction orders and signed receipts of payment can be transmitted at the same time and parallely via existing service channels.

These and other objects of the present invention are accomplished by a computer program product (software) which is preferably embodied on a cellular phone chip, e.g. on the SIM card, which computer program product comprises computer program code means adapted to perform the following steps when run on an electronic communication device:

receiving an electronic bill transmitted via a first channel of said electronic communication device;

upon acknowledgement of said electronic bill by a user of said electronic communication device, creation of a money transfer order and transmission of said money transfer order to a payment provider via a second channel of said electronic communication device;

receiving a receipt of payment from said payment provider and forwarding said receipt of payment to said provider.

In this context, it is clear that the computer reading the software is an electronic communication device, such as a personal computer, personal digital assistant, mobile or stationary digital phone etc.

DETAILED DESCRIPTION OF THE INVENTION

The invention utilises the existing network of telecommunication companies and particularly of the mobile phone GSM network. Millions of users are in possession of a GSM chip card (SIM) in their mobile phone and each of those users has a world-wide unique ID number which is the international mobile subscriber identity IMSI. Thus, a user can be identified securely on (almost) any place of the world. Further, the invention uses the very sophisticated billing system established by the telecommunication providers to charge purchase payment costs with the monthly telecommunication bill.

Figure 1:
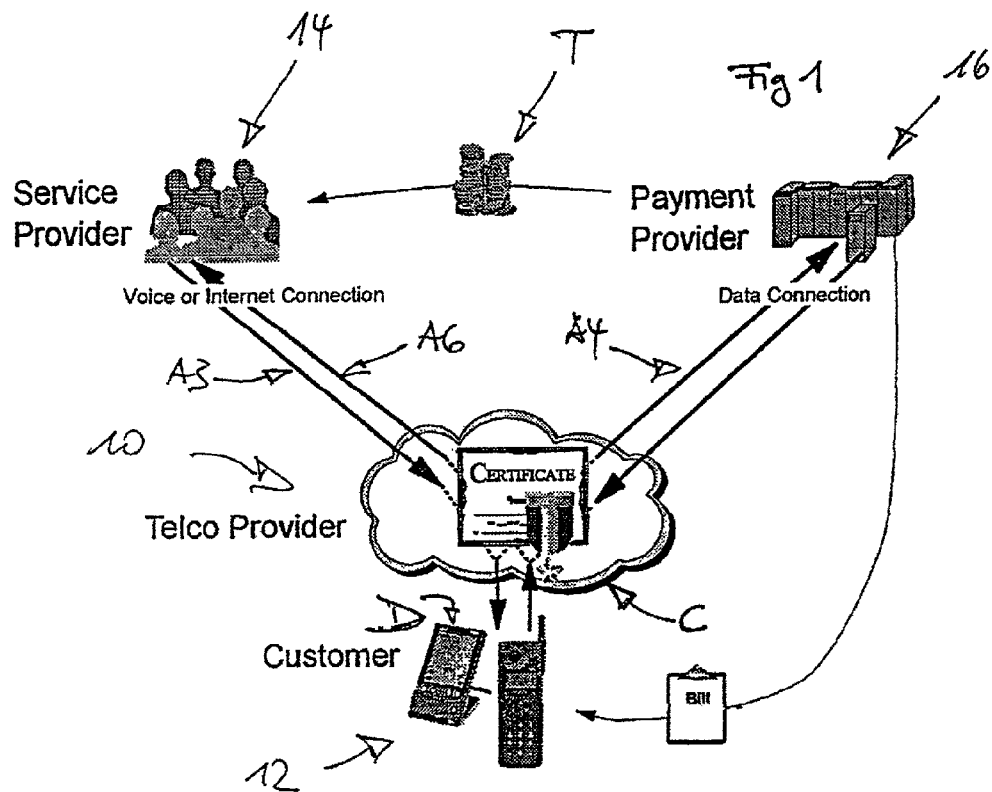
FIG. 1 schematically depicts a telecommunication payment system in accordance with the subject invention.

FIG. 1 shows a schematic overview of the payment system according to the present invention. In the illustration of FIG. 1, a telecommunication provider is generally depicted by 10, a customer is depicted by mobile equipment devices 12 such as a mobile phone or a personal digital assistant PDA. The invention is of course not limited to the use of the telecommunication devices illustrated in FIG. 1 but can also be used in connection with personal computers, stationary digital phones and the like. A service provider offering goods and/or services is generally depicted with 14 and a payment provider, e.g. bank or the like, is depicted with 16. Of course, all participating parties need appropriate terminal equipment, i.e. communication devices. In the case of the telecommunication provider 10 and the payment provider 16, this equipment is preferably fully automated.

Figure 2:
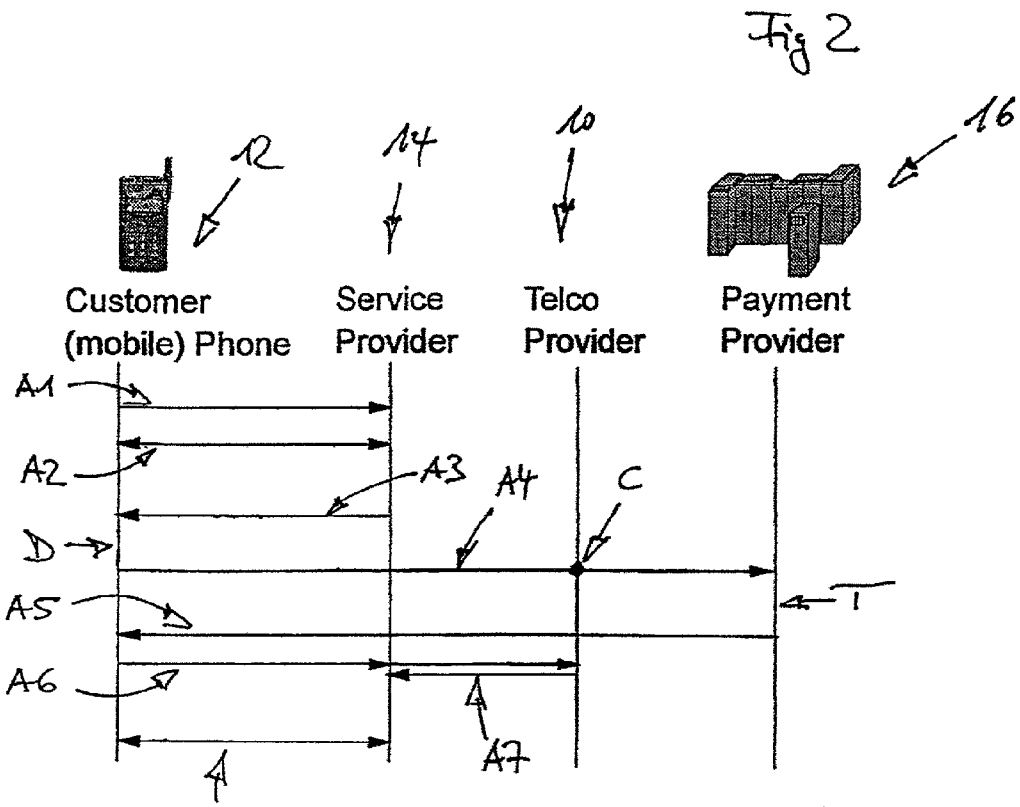
FIG. 2 is a schematic illustration of the function flow of the payment method in accordance with the subject invention.

The customer builds up a connection with the service provider 14 by dialling the service providers telephone number on his communication device 12 in order to establish a voice connection, or enter the internet address of the service provider in order to establish a internet connection. The connection is established via the telecommunication provider 10 who receives users ID data via a data channel. The user ID data is verified in a authentication centre of the telecommunication provider 10 and, upon positive identification, the telecommunication provider 10 grants access to the customer 12 by establishing the connection with the service provider 14 (arrow A1 in FIG. 2). For the further description of the invention, it is assumed that the connection between the customer and the service provider is a voice channel connection.

Via this voice channel connection, the customer asks the provider 14 for a certain product, e.g. a movie theatre ticket. The provider 14 confirms that the ticket is available and states the costs for the ticket. This is performed by voice communication (arrow a 2 in FIG. 2). Then, the provider 14 transmits a digitized bill via a parallel data or service channel of the communication device. This is illustrated by arrow A3 in FIGS. 1 and 2. The transmission of the digitized bill is of course not limited to the data or service channel, but can also be performed by acoustic data transmission via the voice channel (similar to fax machine transmissions).

At D, the amount of the digitized bill is displayed on the communication device 12. The customer verifies the amount and confirms it by pushing an appropriate bottom of the communication device 12. Then, a money transfer order is created in the communication device 12 and sent to the payment provider 16 via the telecommunication provider 10 (arrow A4 in FIGS. 1 and 2). At C, the customer is checked again and authenticated before the money transfer order is passed on to the payment provider who then transfers an appropriate amount to the provider 14. This transfer action is depicted by T in the figures. Alternatively, the authentication of the customer can be performed after the payment provider 16 has received the money transfer order A4 but, of course, before the transfer action T begins.

As a next step, the payment provider 16 sends a signed billing receipt to the customer (arrow A5), from where it is forwarded to the service provider 14 (arrow A6) as proof of payment. The signature of the receipt is an encrypted digital signature which can be confirmed and authenticated by an appropriate authentication centre, e.g. the telecommunication provider 10 (arrows A7). The service provider 14 then acknowledges receipt of the proof of payment via the voice channel (arrow A8), and the purchasing action is completed.

The customer receives a bill from the payment provider on the amount of the money transferred to the provider 14 plus a transaction fee. Preferably, this amount is included with the monthly bill of the telecommunication provider.

Thus, according to the invention, the data to be exchanged, e.g. the bills and receipts, can be transmitted either as digitized acoustic signals using the regular voice connection, or as data via a regular data connection. As pointed out above, the concept according to the present invention is very suitable for but not limited to mobile phones and can be implemented in any other telecommunication device by providing the possibility of insertion of the GSM chip card.

The invention claimed is:

1. A method of payment in a purchasing action performed by means of an electronic communication device between a customer using said electronic communication device and a provider offering goods or services, comprising the steps of:

building up a voice channel connection between the customer and said provider offering goods or services via a communication channel of said communication device, wherein a telecommunication provider authenticates customer identification data using a subscriber identification module (SIM) of said electronic communication device prior to establishing said connection;

subsequent to authentication, placing a purchase order utilizing said voice channel connection of said communication device;

upon receipt of said purchase order from the customer, issuance of an electronic bill by said provider offering goods or services and transmission of said electronic bill to said customer;

upon receipt and acknowledgement of said electronic bill by the customer, transmission of a money transfer order from the customer to a payment provider via the telecommunication provider, wherein the telecommunication provider re-authenticates the customer to ensure that the customer is authorized to give a money transfer order using the subscriber identification module (SIM) of said electronic communication device;

subsequent to acknowledgement of the electronic bill and the re-authentication, executing said money transfer order by said payment provider by debiting an account of the customer;

subsequent to executing said money transfer order, sending a receipt of payment, which includes an encrypted digital signature of the payment provider, from the payment provider to the customer via the telecommunications provider;

subsequent to sending the receipt of payment to the customer, confirming the encrypted digital signature of said receipt by a confirmation center, wherein said confirmation center is the telecommunications provider; and subsequent to confirming the digital signature, forwarding said receipt of payment to said provider offering goods or services;

wherein said steps between the telecommunications provider and the payment provider are employed utilizing fully automated equipment; and wherein a computer program product embodied on the subscriber identification module (SIM) of said electronic communication device performs automated steps comprising:

receiving the electronic bill transmitted via a first channel of said electronic communication device;

upon acknowledgement of said electronic bill by the customer using said electronic communication device, creating said money transfer order;

upon creation of said money transfer order, transmitting said money transfer order to the payment provider via a second channel of said electronic communication device; and receiving said receipt of payment from said payment provider and forwarding said receipt of payment to said provider of goods and services.

2. The method of claim 1 wherein said authentication that the customer is authorized to give a money transfer order is performed by a telecommunication provider via a service channel of said communication device.

3. The method of claim 1 wherein said authentication that the customer is authorized to give a money transfer order is performed before transmission of said money transfer order to said payment provider.

4. The method of claim 1 wherein said authentication that the customer is authorized to give a money transfer order is performed after transmission of said money transfer order to said payment provider.

5. The method of claim 1 wherein transmission of said electronic bill, of said money transfer order and of said receipt of payment is performed via a service channel of said communication device.

6. The method of claim 1 wherein the connection between said customer and said provider offering goods or services is a internet connection.

7. The method according to claim 5 wherein the electronic communication device is a cellular standard communication device and further wherein said communication between said customer and said provider offering goods or services is performed via a voice channel of said communication device.

8. The method of claim 7 wherein an authentication of said customer is provided by a telecommunication provider in the cellular standard network via said service channel.

9. A computer program product comprising computer program code means adapted to perform the following steps when run on an electronic communication device:

building up a voice channel connection between a customer and a provider offering goods or services via a communication channel of said communication device, wherein a telecommunication provider authenticates customer identification data using a subscriber identification module (SIM) of said electronic communication device prior to establishing said connection;

subsequent to authentication, placing a purchase order utilizing said voice channel connection of said communication device;

upon receipt of said purchase order from the customer, issuance of an electronic bill by said provider offering goods or services and transmission of said electronic bill to said customer;

upon receipt and acknowledgement of said electronic bill by the customer, transmission of a money transfer order from the customer to a payment provider via the telecommunication provider, wherein the telecommunication provider reauthenticates the customer to ensure the customer is authorized to give a money transfer order using the subscriber identification module (SIM) of said electronic communication device;

subsequent to acknowledgement of the electronic bill and reauthentication, executing said money transfer order by said payment provider by debiting an account of the customer;

subsequent to executing said money transfer order, sending a receipt of payment, which includes an encrypted digital signature of the payment provider, from the payment provider to the customer via the telecommunications provider;

subsequent to sending the receipt of payment to the customer, confirming the encrypted digital signature of said receipt by a confirmation center, wherein said confirmation center is the telecommunications provider;

subsequent to confirming the digital signature, forwarding said receipt of payment to said provider offering goods or services wherein said steps between the telecommunications provider and the payment provider are employed utilizing fully automated equipment; and wherein said steps of receiving the electronic bill, acknowledgement of said electronic bill by a user, creation of the money transfer order and transmission of said money transfer order to the payment provider, and receiving the receipt of payment from said payment provider and forwarding said receipt of payment to said provider of goods and services, are performed by executing a computer program product embodied on the subscriber identification module (SIM) of said electronic communication device.

10. The computer program product of claim 9 embodied on a computer readable medium.

11. The computer program product of claim 10 wherein said communications device is a personal computer.

12. The method of claim 1 wherein said account is maintained by said telecommunications provider.

13. The method of claim 1 wherein said electronic communication device is a personal computer.

14. The method of claim 9 wherein said electronic communication device is a personal computer.

* * * * *